US010553139B2

(12) United States Patent
Bohn

(10) Patent No.: US 10,553,139 B2
(45) Date of Patent: Feb. 4, 2020

(54) ENHANCED IMAGING SYSTEM FOR LINEAR MICRO-DISPLAYS

(71) Applicant: MICROSOFT TECHNOLOGY LICENSING, LLC, Redmond, WA (US)

(72) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 15/348,911

(22) Filed: Nov. 10, 2016

(65) Prior Publication Data
US 2018/0130391 A1 May 10, 2018

(51) Int. Cl.
*G09G 3/02* (2006.01)
*G02B 27/01* (2006.01)
(Continued)

(52) U.S. Cl.
CPC ........... *G09G 3/02* (2013.01); *G02B 26/0883* (2013.01); *G02B 26/108* (2013.01);
(Continued)

(58) Field of Classification Search
CPC .......... G02B 3/02; G02B 27/01; G02B 27/00; G02B 27/0172; G02B 27/0093;
(Continued)

(56) References Cited

U.S. PATENT DOCUMENTS 5,422,653 A 6/1995 Maguire, Jr.
7,403,337 B2 7/2008 Ou
(Continued)

FOREIGN PATENT DOCUMENTS

EP 1986032 A1 10/2008
WO 2009048562 A1 4/2009
(Continued)

OTHER PUBLICATIONS

Cheng, et al., "Design of a Wide-Angle, Lightweight Head-Mounted Display using Free-Form Optics Tiling", In Proceedings of Optics Letters, vol. 36, Issue 11, May 31, 2011, 3 Pages.
(Continued)

*Primary Examiner* — Jie Lei
(74) *Attorney, Agent, or Firm* — Newport IP, LLC; Scott Y. Shigeta

(57) ABSTRACT

An optical system comprises a linear illumination source configured to emit light, a first scanning stage configured to receive the light and to scan the light, and a second scanning stage. The linear illumination source is configured to generate light forming a vertical field of view based on the one or more output signals received from a controller modulating the one or more output signals comprising image data defining content. The first scanning stage redirects portions of the light to generate an output defining a horizontal field of view based on the one or more output signals of the controller. The first scanning device combines the vertical field of view and the horizontal field of view in the output light to create a two-dimensional light image of the content. The second scanning stage receives and directs the output of the first scanning stage toward a projected exit pupil.

7 Claims, 9 Drawing Sheets

(51) Int. Cl.
*G02B 26/10* (2006.01)
*G02B 26/08* (2006.01)
*G02B 27/00* (2006.01)
*G06F 3/01* (2006.01)

(52) U.S. Cl.
CPC ..... *G02B 27/0093* (2013.01); *G02B 27/0172* (2013.01); *G06F 3/013* (2013.01); *G09G 2340/0407* (2013.01); *G09G 2354/00* (2013.01)

(58) Field of Classification Search
CPC ...... G02B 26/10; G02B 26/08; G02B 26/108; G02B 26/0883; G06F 3/01; G06F 3/013; G09G 3/02; G09G 2340/0407; G09G 2354/00
USPC ............ 359/13, 618, 630–633; 345/7, 8, 32
See application file for complete search history.

(56) References Cited

U.S. PATENT DOCUMENTS

| | | |
|---|---|---|
| 7,872,635 B2 | 1/2011 | Mitchell |
| 7,898,712 B2 | 3/2011 | Adams et al. |
| 8,294,080 B2 | 10/2012 | Rana |
| 8,491,121 B2 | 7/2013 | Tilleman et al. |
| 8,698,705 B2 | 4/2014 | Burke |
| 2005/0068255 A1 | 3/2005 | Urakawa |
| 2009/0153796 A1 | 6/2009 | Rabner |
| 2011/0013244 A1 | 1/2011 | Futterer |
| 2011/0134017 A1 | 6/2011 | Burke |
| 2011/0242635 A1 | 10/2011 | Oka |
| 2012/0033306 A1 | 2/2012 | Valera et al. |
| 2012/0105310 A1 | 5/2012 | Sverdrup et al. |
| 2012/0257282 A1 | 10/2012 | Hudman |
| 2013/0162673 A1 | 6/2013 | Bohn |
| 2013/0208003 A1 | 8/2013 | Bohn et al. |
| 2014/0071539 A1 | 3/2014 | Gao |
| 2014/0293434 A1 | 10/2014 | Cheng et al. |
| 2015/0036108 A1 | 2/2015 | Taniguchi et al. |
| 2015/0082680 A1 | 3/2015 | Szapiel |
| 2015/0103155 A1 | 4/2015 | Szapiel |
| 2015/0212325 A1 | 7/2015 | Choi et al. |
| 2015/0283021 A1 | 10/2015 | Daly |
| 2018/0129167 A1* | 5/2018 | Maimone ............. G03H 1/2645 |

FOREIGN PATENT DOCUMENTS

| | | |
|---|---|---|
| WO | 2009131626 A2 | 10/2009 |
| WO | 2013093510 A2 | 6/2013 |
| WO | 2016046514 A1 | 3/2016 |

OTHER PUBLICATIONS

Hua, et al., "A High-Resolution Optical See-Through Head-Mounted Display With Eyetracking Capability", In Journal of Optics Express, vol. 21, Issue 25, Dec. 9, 2013, 6 Pages.

Hua, Hong, "Large Field-of-View and High Resolution Free-Form Head-Mounted Display", In Proceedings of SPIE—The International Society for Optical Engineering, Jun. 2010, 4 Pages.

"International Search Report and Written Opinion Issued in PCT Application No. PCT/US2017/046442", dated Jan. 31, 2018, 16 Pages.

"International Search Report and Written Opinion Issued in PCT Application No. PCT/US2017/060258", dated Feb. 22, 2018, 12 Pages.

"Final Office Action Issued in U.S. Appl. No. 15/239,379", dated Jan. 28, 2019, 12 Pages.

"Non Final Office Action Issued in U.S. Appl. No. 15/239,379", dated Oct. 4, 2018, 12 Pages.

* cited by examiner

FRONT VIEW

END VIEW

ENHANCED IMAGING SYSTEM FOR LINEAR MICRO-DISPLAYS

BACKGROUND

Optical systems may scan light from an illumination source in one or more dimensions to produce a viewable image. Various scanning systems may be used, including but not limited to movable mirrors, prisms, lenses, and diffractive elements. Although current technologies enable portable devices to produce viewable images, there is a continual need for improvements. The need for such improvements only increase as the physical size and price point of imaging devices decrease.

It is with respect to these and other considerations that the disclosure made herein is presented.

SUMMARY

Examples are disclosed herein that relate to scanning optical systems. One example provides an optical system comprising a linear illumination source configured to emit light, a first scanning stage configured to receive the light and to scan the light, and a second scanning stage to direct an output toward a projected exit pupil. The linear illumination source is configured to generate light forming a vertical field of view based on one or more signals received from a controller modulating the one or more signals comprising image data defining content. The first scanning stage redirects portions of the light to generate an output light defining a horizontal field of view based on the one or more output signals of the controller. The first scanning device combines the vertical field of view and the horizontal field of view in the output light to create a two-dimensional light image of the content. The second scanning stage receives and directs the output light of the first scanning stage toward a projected exit pupil.

Another example provides an optical system comprising a linear illumination source configured to emit light, a scanning electro-optic element configured to receive the light and to scan the light, and a waveguide configured to receive light from the scanning electro-optic element and to direct the light toward an eyebox, the waveguide comprising a pupil replication stage. The linear illumination source forming a vertical field of view based on one or more output signals received from a controller modulating the one or more output signals comprising image data defining content. The scanning electro-optic element redirects portions of the light to generate an output defining a horizontal field of view based on the one or more output signals of the controller. The output of the scanning electro-optic element comprises the vertical field of view and the horizontal field of view. The vertical field of view and the horizontal field of view create a light image of the content at the eyebox, e.g., at an area within a predetermined distance from the scanning electro-optic element.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document. Furthermore, the claimed subject matter is not limited to implementations that solve any or all disadvantages noted in any part of this disclosure.

DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 shows an example optical system with a first scanning stage and a second scanning stage.

FIG. 2A schematically shows an example waveguide-based optical system utilizing a first scanning stage and a second scanning stage.

FIG. 2B and FIG. 2C respectively show a front view and an end view of the optical system shown in FIG. 2A.

FIG. 2D shows an example optical system with a single scanning stage.

FIG. 3 schematically shows an example non-waveguide-based optical system utilizing a first scanning stage and a second scanning stage.

FIG. 4 schematically shows another example waveguide-based optical system.

DETAILED DESCRIPTION

Scanning mechanisms in optical systems may utilize mirrors, prisms and other optical components to scan light from a light source to generate images. However, such scanning systems may suffer from a small exit pupil (the area through which imaged light passes to exit the optical system), a small eyebox (the region in space in which the image is viewable), and a limited field-of-view. Further, in such systems, the exit pupil may reside inside or very close to the optics used in the scanning system. Because the light passing through the exit pupil continues to expand as it travels from the exit pupil, a user's eye may need to be positioned inconveniently close to or right up against the scanning optic in order to see the full field of view of the imaged light and to avoid a vignetted or clipped image.

Similarly, a waveguide-based optical system may utilize a scanning system to scan light that is input into the waveguide. Due to the location of the exit pupil within the scanning optic, the waveguide may be positioned very close to or against the scanning optic for efficient coupling of the light into waveguide. Although this may provide a compact configuration, current scanning technologies may not be able to provide a desired range of angles of scanned light or be able to scan light at a sufficient rate for image production. For example, the entrance pupil of a waveguide may be approximately 3 mm in diameter, while a microelectromechanical systems (MEMS) mirror scanning system may produce a beam diameter of approximately 1 mm, thus resulting in a light beam diameter that is very small relative to the entrance pupil of the waveguide.

Accordingly, examples are disclosed herein that relate to scanning systems that may provide for larger beam diameters than provided by MEMS or some other scanning systems. Further, the disclosed examples also provide for the projection of an exit pupil, thereby allowing a more comfortable spacing to be achieved between an eye and a scanning optical element. The disclosed examples may be utilized in waveguide-based optical systems as well as non-waveguide-based optical systems. In examples that utilize a waveguide, the waveguide may have a pupil replication stage to replicate and expand the exit pupil.

In addition, the techniques disclosed herein enable the use of more simplified waveguide structures, which can ultimately reduce manufacturing costs. In most existing systems, optical scanning systems require complex waveguide structures that require light expansion in two dimensions. The techniques disclosed herein enable the use of more simplified waveguide structures, e.g., waveguides configured for one-dimensional light expansion.

Figure 1:
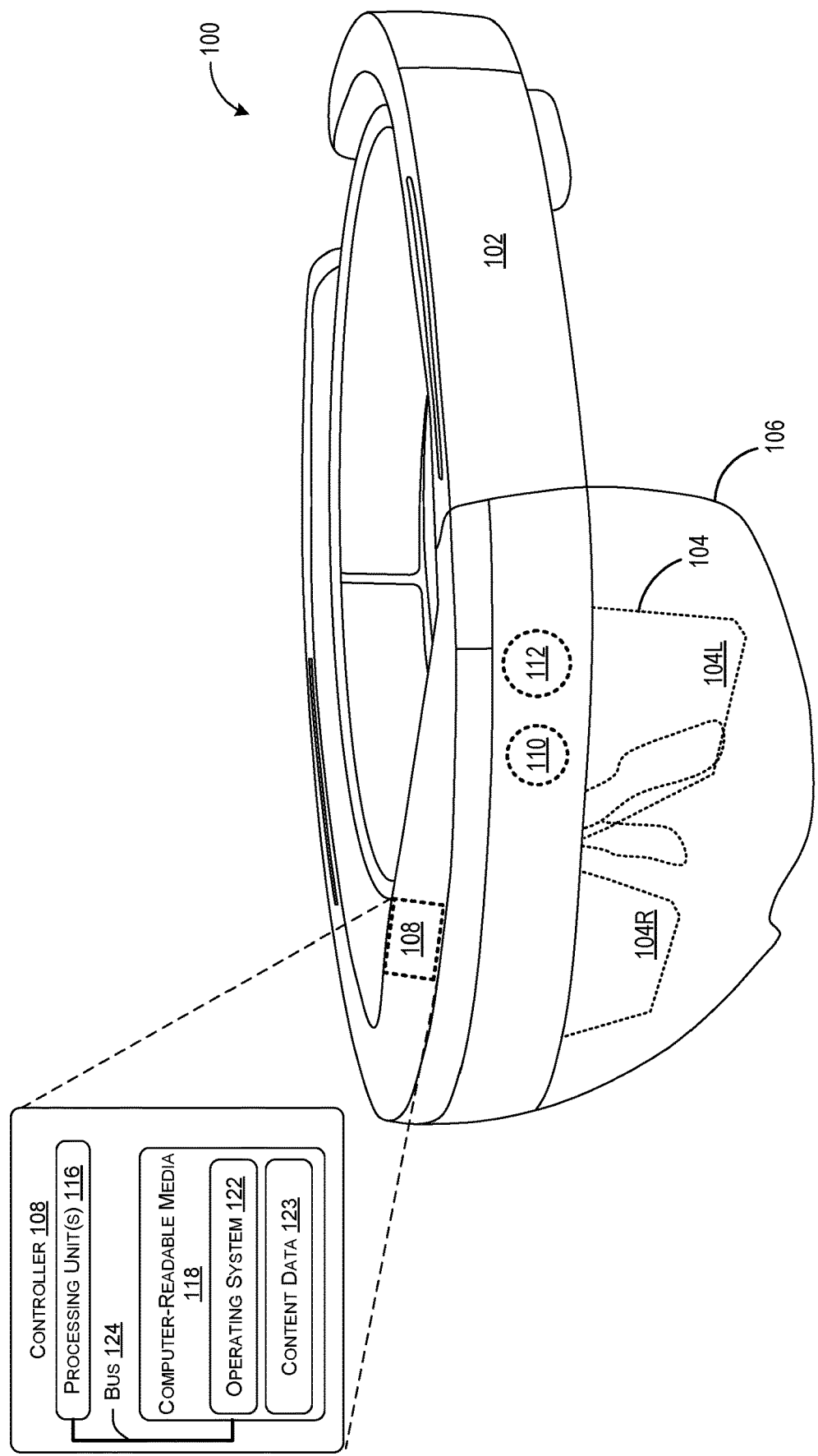

FIG. 1 shows an example optical system in the form of a head-mounted display device 100 that may utilize scanning of light from a linear light source for image generation. The head-mounted display device 100 includes a frame 102 in the form of a band wearable around a head of a user that supports see-through display componentry positioned near the user's eyes. The head-mounted display device 100 may utilize augmented reality technologies to enable simultaneous viewing of virtual display imagery and a view of a real-world background. As such, the head-mounted display device 100 is configured to generate virtual images via see-through display 104. The see-through display 100, as depicted, includes separate right and left eye displays 104R and 104L, which may be wholly or partially transparent. In other examples, a see-through display may have a single display viewable with both eyes. The see-through display 104 can be in any suitable form, such as a waveguide or prism configured to receive a generated image and direct the image towards a wearer's eye. The see-through display device 104 may include any suitable light source for generating images, such as a one-dimensional linear array.

The head-mounted display device 100 further includes an additional see-through optical component 106, shown in FIG. 1 in the form of a see-through veil positioned between see-through display 104 and the background environment as viewed by a wearer. A controller 108 is operatively coupled to the see-through optical component 104 and to other display componentry. The controller 108 includes one or more logic devices and one or more computer memory devices storing instructions executable by the logic device(s) to enact functionalities of the display device. The controller 108 can comprise one or more processing unit(s) 116, computer-readable media 118 for storing an operating system 122 and data, such as content data 123. As will be described in more detail below, the device 100 can also include a linear light source and one or more scanning devices. The components of device 100 are operatively connected, for example, via a bus 124, which can include one or more of a system bus, a data bus, an address bus, a PCI bus, a Mini-PCI bus, and any variety of local, peripheral, and/or independent buses.

The processing unit(s), processing unit(s) 116, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 118, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The head-mounted display device 100 may further include various other components, for example a two-dimensional image camera 110 (e.g. a visible light camera and/or infrared camera) and a depth camera 112, as well as other components that are not shown, including but not limited to eye-gaze detection systems (e.g. one or more light sources and eye-facing cameras), speakers, microphones, accelerometers, gyroscopes, magnetometers, temperature sensors, touch sensors, biometric sensors, other image sensors, energy-storage components (e.g. battery), a communication facility, a GPS receiver, etc.

Figure 2A:
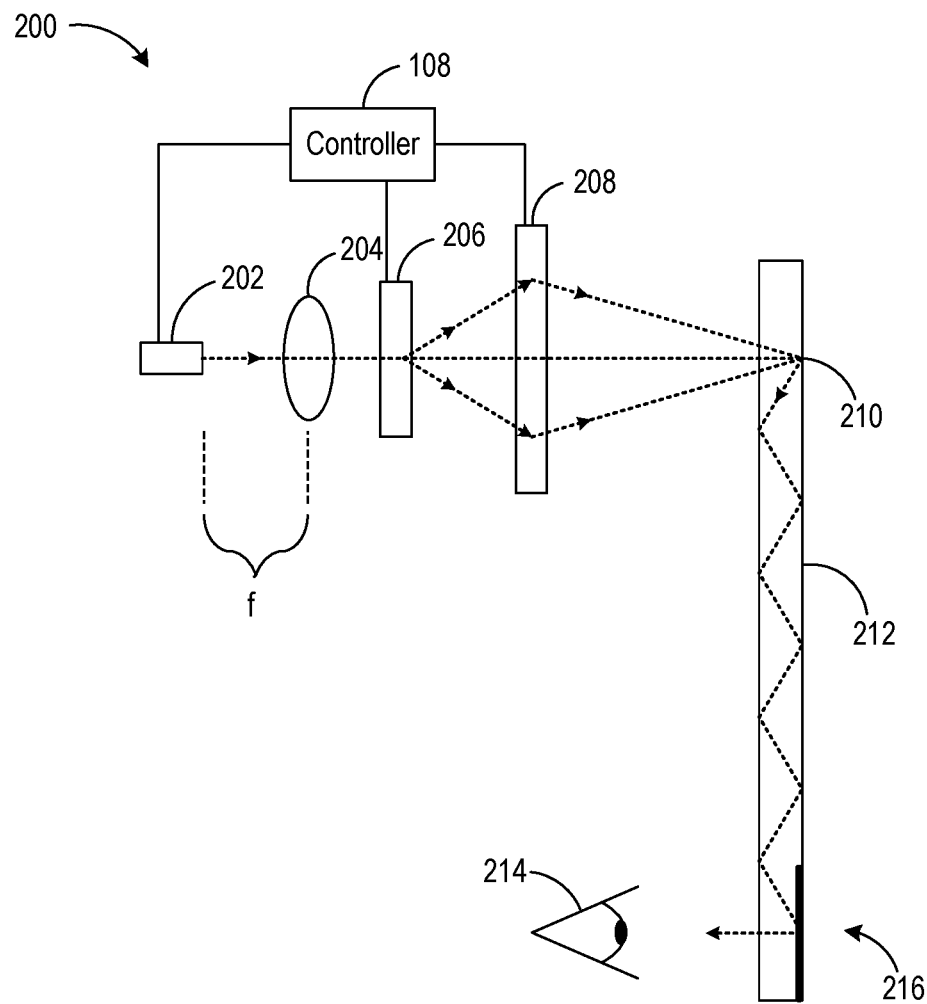

FIG. 2A schematically shows an example scanning optical system 200 suitable for use in head-mounted display device 100. Optical system 200 comprises a linear illumination source 202, such as a linear array of elements configured to emit light of any suitable wavelength or wavelengths. In some configurations, the illumination source 202 comprises a linear illumination source is configured to generate light forming a vertical field of view based on one or more output signals received from the controller 108 modulating the one or more output signals comprising image data defining content. The vertical field of view can be produced by a plurality of individual light sources on the linear illumination source 202, each of which can be laser emitters or individual light emitting diodes (LEDs). Individual lines of an image can be emitted from the linear illumination source 202 at predetermined times, the timing of which can coordinate the timing of first scanning stage described below.

For illustrative purposes, output signals comprising image data, or output signals generated as a function of image data, can be produced using any suitable technology, which may involve one or more codecs and/or other suitable technologies for generating an electronic signal or data set containing image data defining content, which can be either a still image data and/or video data. The content can include a video or still images that are defined in the content data 123. Light from the linear illumination source 202 is directed toward a collimator 204, which collimates the light received from linear illumination source 202. In other examples, the collimator 204 can be omitted. In some configurations, the collimator 204 can have a focal distance (f), which can be a distance between the linear illumination source 202 and the collimator 204.

Light passing through collimator 204 is received at first scanning stage 206. First scanning stage 206 is configured to scan the light, which can include a line-by-line scan of an image along a first axis, and the linear illumination source 202 can be a line source (e.g. a one-dimensional array of lasers) along a second axis, wherein the first axis and the second axis are perpendicular. In some configurations, the linear illumination source 202 generates light forming a vertical field of view based on one or more signals of a controller. The first scanning stage 206 redirects portions of the generated light to form an output light defining a horizontal field of view based on the one or more output signals of the controller 108. The controller 108 coordinates the light emitted from the linear illumination source 202, and aspects of the first scanning stage 206 to produce an output light of first scanning stage 206 to control the vertical field of view and the horizontal field of view such that the light projected from the second scanning stage 208 produces a two-dimensional light image.

An output light produced by first scanning stage 206 is received at second scanning stage 208. Second scanning stage 208 may scan the light received from first scanning stage 206 toward a projected exit pupil 210. More specifically, the second scanning stage 208 captures light that is diverging from the first scanning stage 206 and directs the light to the exit pupil 210 at a predetermined distance from the second scanning stage 208. The controller 108 coordinates the linear illumination source 202, the first scanning stage 206, and the second scanning stage 208 to control the vertical field of view and the horizontal field of view such that the light projected from the second scanning stage 208 produces a two-dimensional light image of the content at an exit pupil 210.

This configuration enables downstream optical elements (e.g. a waveguide or a human eye) to be located a comfortable distance from the first scanning stage and the second scanning stage. In contrast, in systems utilizing a single scanning stage, the exit pupil may be located within the scanning stage. As such, an eye, waveguide or other optical element may need to be placed much closer to the scanning stage to avoid light loss or vignetting.

Scanning stages 206, 208 may utilize any suitable scanning mechanism configured to scan the light in one or more dimensions. As one example, either or both of scanning stages 206, 208 may take the form of a rotating prism pair, such as a Risley prism pair, where two wedge-shaped prisms are rotated relative to one another to scan a beam of light in two dimensions. Risley prism pairs may produce a beam diameter that is sufficiently large to feed into the entrance pupil of a waveguide, in contrast to MEMS mirror scanners.

As another example, either or both of scanning stages 206, 208 may utilize electro-optics, such as electrowetting technologies, to perform non-mechanical scanning. As a more specific example, a linear array of electrowetting microprisms (EMPs) may be fabricated in a silicon-on-oxide substrate, and may be controllable via voltage sources to steer an incoming light beam at an angle. The EMP array may be configured to scan the light in one or more dimensions. Scanning stages 206, 208 also may utilize electrowetting lens elements. As an example of such a configuration, a scanning stage may utilize a one-dimensional (the first scanning stage 206) and a two-dimensional (the second scanning stage 208) micro-array of electrowetting lens elements, where each lens element comprises a volume of oil and water with an interface configured to vary in shape in a controllable manner and thus steer light based upon an applied voltage. Thus, each electrowetting lens element in the array may separately deviate light, acting similarly to a Fresnel prism.

As yet another example, either or both of scanning stages 206, 208 may utilize liquid crystal elements. The refractive index of a liquid crystal element may be changed by applying voltage to the element, which allows control of the refraction of light by the element. It will be understood that any other suitable scanning technologies may be utilized, including but not limited to deformable polymers.

Continuing with FIG. 2A, waveguide 212 receives light from second scanning stage 208 at an input coupling positioned at or near the projected exit pupil 210. The light is conducted along the waveguide 212 via total internal reflection to an output coupling which, in turn, outputs the light toward an eyebox 214. As light propagates through waveguide 212, a field-of-view of the imaged light may be expanded in two dimensions. In some examples, waveguide 212 may include a pupil replication stage 216. The pupil replication stage 216 may include any suitable optical element(s) configured to replicate and expand the exit pupil, including but not limited to one or more surface relief gratings, Bragg gratings, and/or partially reflecting surfaces. Each time light from the light source interacts with an element in pupil replication stage 216, the element makes a copy of the light beam. In this manner, pupil replication stage 216 may create and overlay multiple copies of the exit pupil on one another, thereby creating a rectangular-shaped, or any other suitably shaped, expanded exit pupil. The output grating also may help to expand the light. This configuration may preserve all angles of light across all fields of view within the waveguide while still increasing the size of the exit pupil, which may ensure uniform illumination of the exit pupil as well as uniform energy across all fields of view. Further, the expanded, rectangular-shaped exit pupil may help to accommodate for differences in interpupillary distances of users.

Figure 2B:
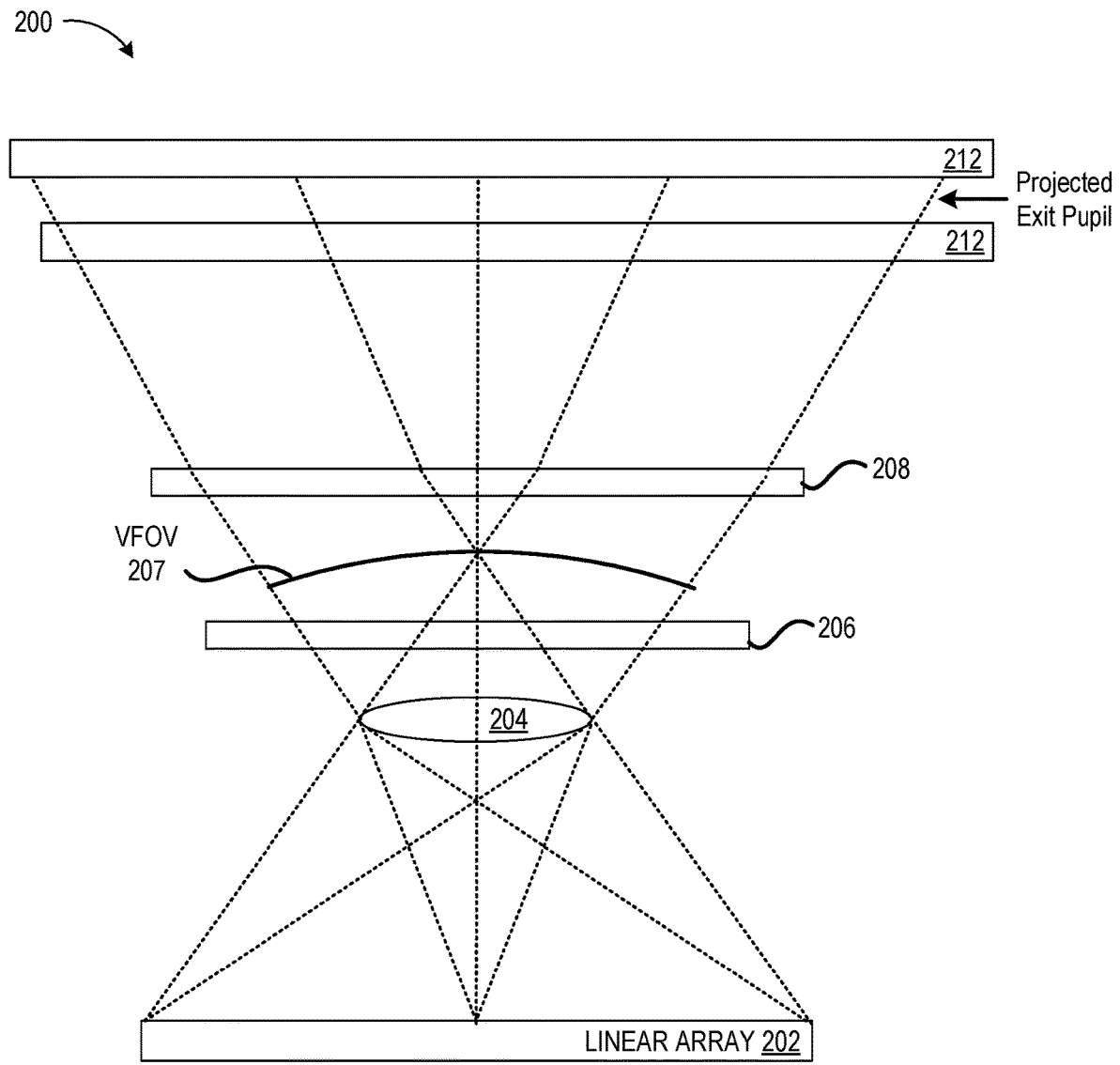
Figure 2C:
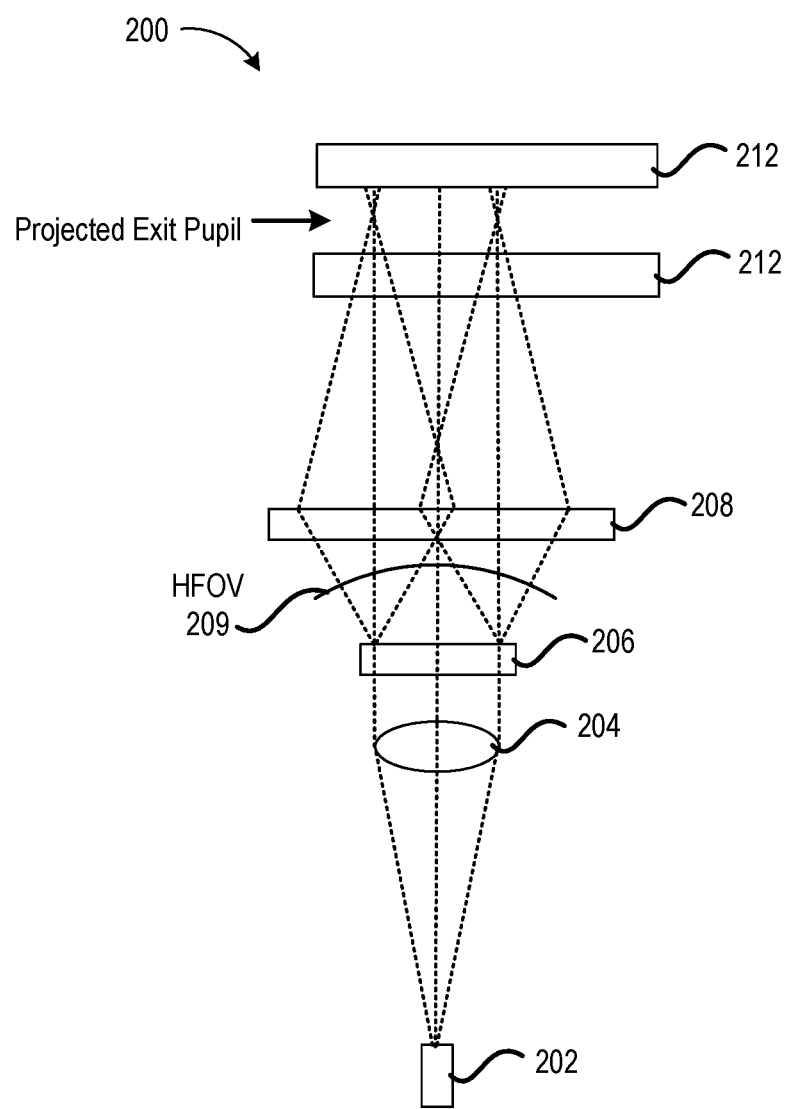

FIG. 2B illustrates a front view of the optical system 200 shown in FIG. 2A. The linear illumination source is configured to generate light forming a vertical field of view (VFOV 207) based on one or more output signals received from a controller modulating the one or more output signals comprising image data defining content. FIG. 2C illustrates an end view of the optical system 200 shown in FIG. 2A. The first scanning stage redirects portions of the light to generate an output defining a horizontal field of view (HFOV 209) based on the one or more output signals of the controller. As shown, the linear illumination source 202, first scanning stage 206, and second scanning stage 208 are configured to form an image and direct the image toward projected exit pupil, which can be between two waveguide components 212.

Figure 2D:
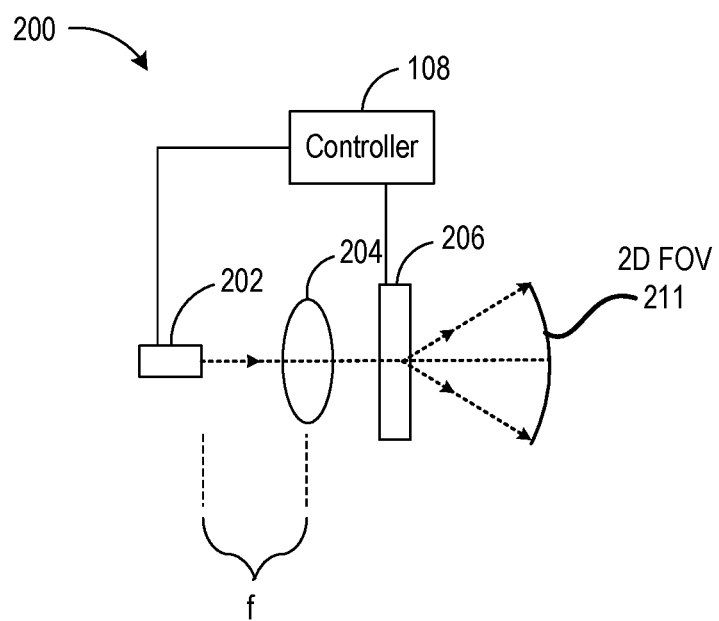

In some configurations, the optical system 200 may include a single scanning stage. FIG. 2D illustrates one example of such configurations. In such configurations, the linear illumination source 202 generates light comprising a vertical field of view of an image. The light is directed to a single scanning stage 206, which generates an output light forming a horizontal field of view of the image. The single scanning stage 206 combines the vertical field of view and the horizontal field of view in the output light of the scanning stage 206 to create a two-dimensional light image (2D FOV 211) of the content.

Figure 3:
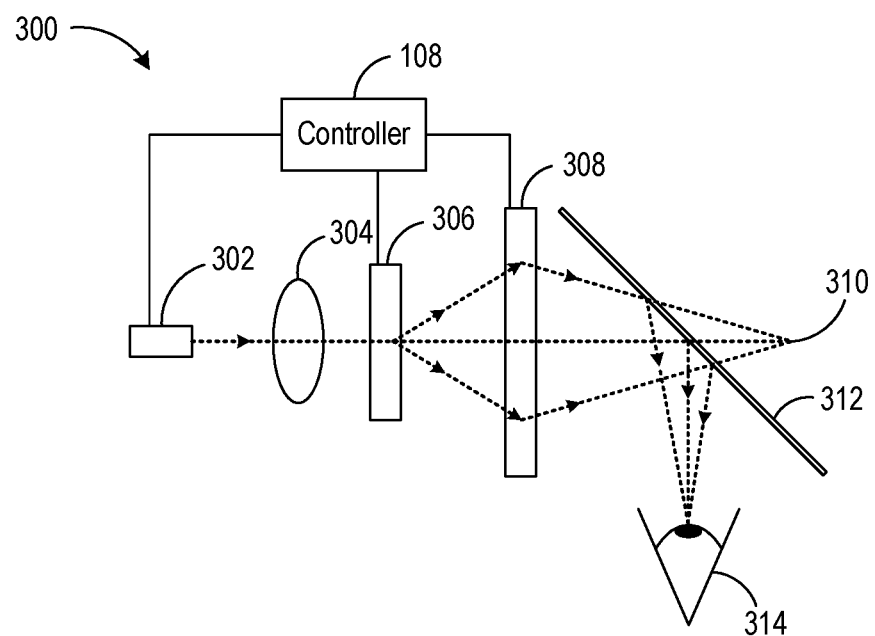

FIG. 3 schematically shows another example optical system 300 for scanning light from an illumination source 302 to form an image. Optical system 300 likewise projects an exit pupil, but does not utilize a waveguide. Instead, optical system 300 projects an exit pupil to a location a comfortable distance away from scanning optics for a user's eye. Optical system 300 comprises a collimator 304, a first scanning stage 306 for scanning light from the linear light source across a desired area, and a second scanning stage 308 for projecting an exit pupil, as described above with regard to optical system 200. However, rather than a waveguide, optical system 300 comprises a suitable reflective element, such as a partially reflecting mirror 312, to direct at least a portion of the light toward eye 314. Optical system 300 also includes a controller 108 for controlling the operation of linear illumination source 302, first scanning stage 306, and second scanning stage 308 to form an image and direct the image toward projected exit pupil 310. The location of the projected exit pupil 310 allows scanning stages 306, 308 to be positioned above and away from the front of the eye 314, which may facilitate viewing of a real-world background through the optics, e.g. for augmented reality settings.

Figure 4:
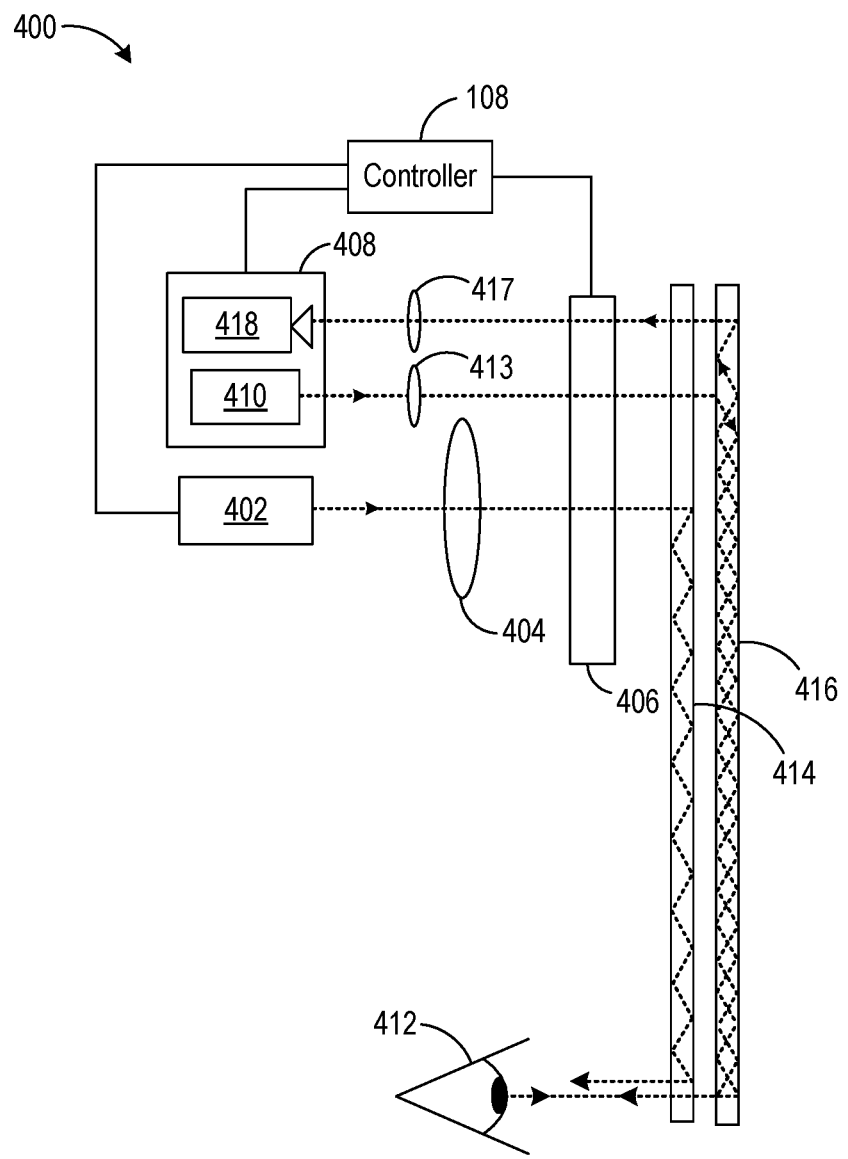

FIG. 4 schematically shows another example optical system 400 comprising a linear illumination source 402, a collimator 404, and a scanning electro-optic element 406 configured to receive and scan the light received from the linear illumination source 402 and collimator 404. The linear illumination source 402 is configured to generate a vertical field of view based on the one or more output signals as described herein. The scanning electro-optic element 406 is configured to form a horizontal field of view based on the one or more output signals as described herein. The optical system 400 also includes an eye tracking system 408 having one or more light source(s) 410 and a camera 412. Light from light source(s) 410 is collimated by collimator 413 and also scanned by the scanning electro-optic element 406. Optical system 400 further includes a first waveguide 414 and a second waveguide 416. First waveguide 414 is configured to receive imaged light from the illumination source 402 and variable optical element 406 and propagate the light throughout first waveguide 408 to deliver the light to a user's eye 412. Likewise, second waveguide 416 is configured to receive light from one or more light source(s) 410 of the eye tracking system 408 and variable optical element 406, and to propagate the light through second waveguide 416 and deliver the light to eye 412.

Light source(s) 410 may be configured to utilize different wavelengths of light than that utilized by illumination source 402, such as infrared light that is not visible to a user. The light from light source(s) 410 reflects from eye 412 and returns in a reverse direction via second waveguide 416 to pass back through scanning electro-optic element 406 and an imaging lens 417 to an eye tracking camera 418. Eye tracking camera 418 may capture images that can be analyzed to detect glints or reflections off the cornea (or other suitable anatomical structure) arising from the light source 410. In some examples, light from light source(s) 410 may be scanned via scanning electro-optic element 406 to produce glints from multiple directions. For example, a single laser may be used to direct IR light in several different predetermined directions, instead of using multiple light sources each configured to cause a single glint. In other examples, eye tracking system 408 may utilize any other suitable scanner than variable optical element 406, including but not limited to a prism pair.

Optical system 400 also includes a controller 108 for controlling the operation of illumination source 402, light source(s) 410 and eye tracking camera 418 of eye tracking system 408, and scanning electro-optic element 406. In some examples, controller 108 may be configured to provide foveated display capabilities. More specifically, eye tracking may be used to estimate a location of a user's fovea. Then, higher resolution foveal images may be displayed in the estimated location of the fovea, and lower resolution image may be displayed peripherally. The location at which foveal images are displayed likewise may be updated as the position of the user's eye moves.

Figure 5:
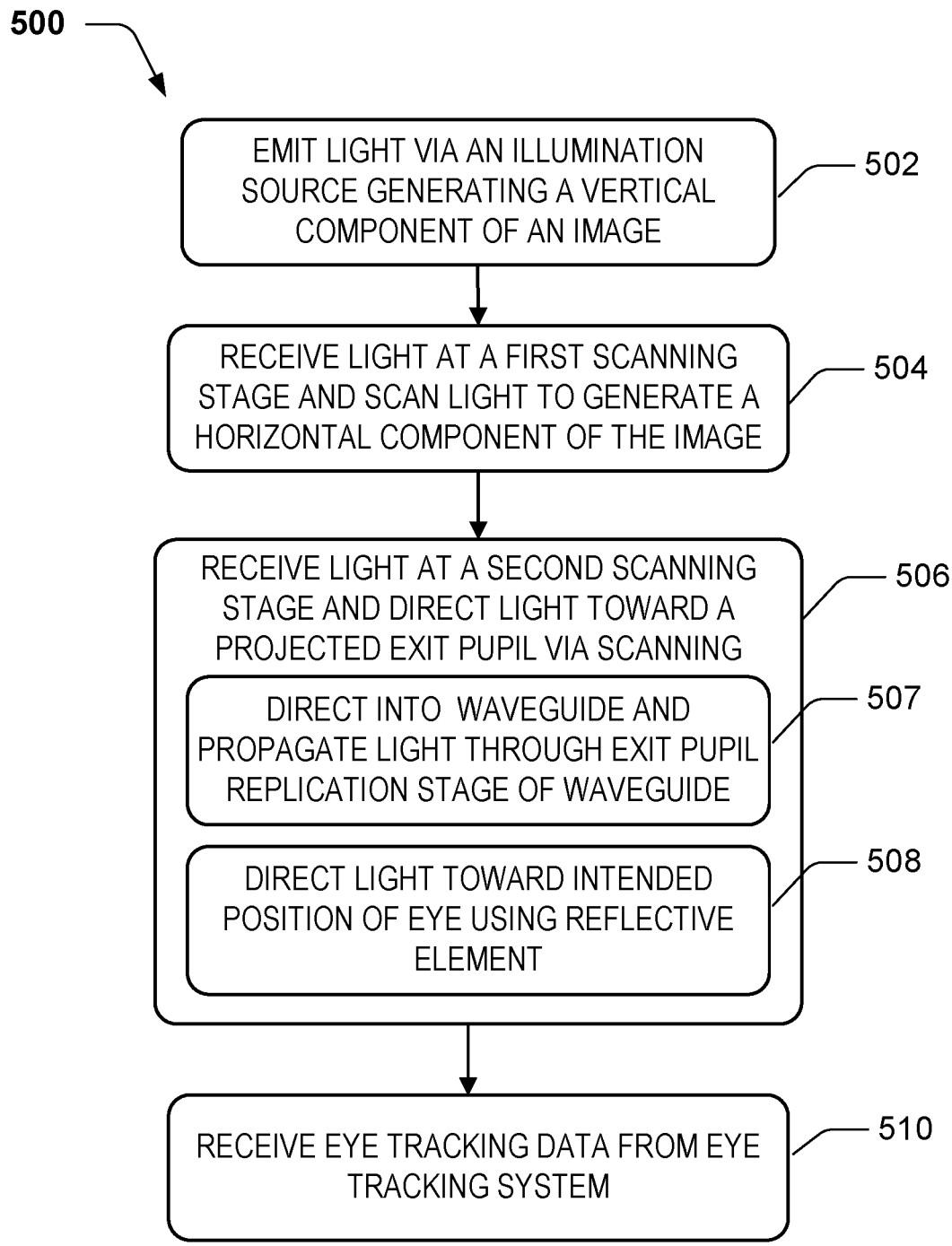
FIG. 5 is a flowchart illustrating an example method of scanning light in an optical system.

FIG. 5 shows an example method 500 for scanning light in an optical system. Method 500 includes, at 502, emitting light via a linear illumination source, such as a linear array. The linear illumination source is configured to generate light forming a vertical field of view based on the one or more output signals received from a controller modulating the one or more output signals comprising image data defining content. Method 500 further includes, at 504, receiving light at a first scanning stage and scanning the light received from the linear illumination source. The first scanning stage redirects portions of the light received from the linear illumination source to generate output light defining a horizontal field of view based on the one or more output signals of the controller. The output of the first scanning stage comprises the vertical field of view and the horizontal field of view, both of which create a light image of the content defined in content data processed by the controller. In some configurations, the first scanning device combines the vertical field of view and the horizontal field of view in the output light to create a two-dimensional light image of the content.

At operation 506, the output of the first scanning stage is received at a second scanning stage. The second scanning stage directs the output of the first scanning stage toward a projected exit pupil. The projected exit pupil may be positioned at or adjacent to a waveguide such that the light is directed into the waveguide, as indicated at 507, or may be directed toward at an intended position of a user's eye via a reflective element, as indicated at 508. In examples where a waveguide is utilized, the waveguide may propagate the light through a pupil replication stage of the waveguide before emitting the light for viewing. In examples where a waveguide is not utilized, a reflective element may be configured to receive light directly from the scanning stage(s) and direct the light toward the eye, such as a partially reflecting mirror, as described above with regard to FIG. 3.

As mentioned above, eye tracking may be used in combination with scanning to display foveated images. Thus, method 500 may include, at 510, receiving eye tracking data from an eye tracking system. As described herein, operation 510 can enable a system to provide higher resolution foveal images and lower resolution peripheral images based upon the eye tracking data.

While described herein in the context of near-eye display systems, the example optical systems and methods disclosed herein may be used in any suitable optical system, such as a rifle scope, telescope, spotting scope, binoculars, and heads-up display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
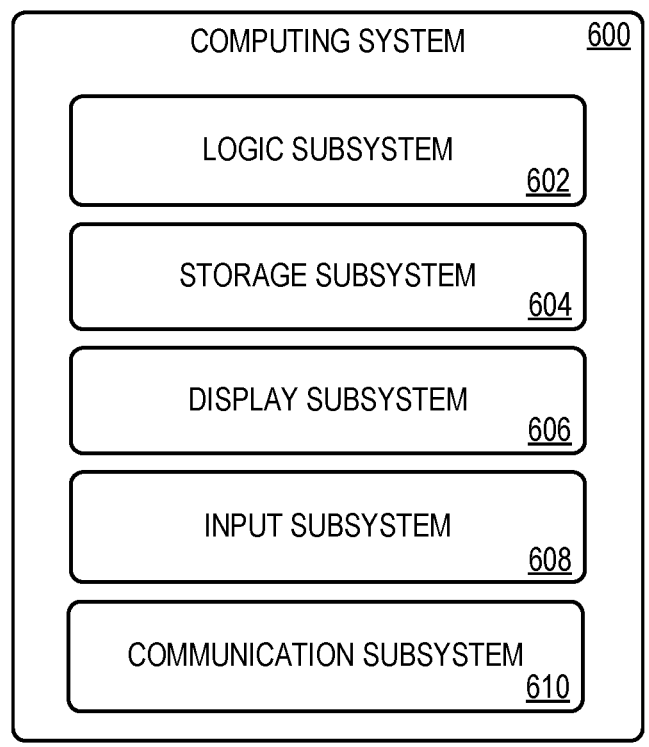
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 602 may include one or more processors configured to execute software instructions. Additionally or alternatively, logic subsystem 602 may include one or more hardware or firmware logic machines configured to execute hardware or firmware instructions. Processors of logic subsystem 602 may be single-core or multi-core, and the instructions executed thereon may be configured for sequential, parallel, and/or distributed processing. Individual components of logic subsystem 602 optionally may be distributed among two or more separate devices, which may be remotely located and/or configured for coordinated processing. Aspects of logic subsystem 602 may be virtualized and executed by remotely accessible, networked computing devices configured in a cloud-computing configuration.

Storage subsystem 604 includes one or more physical devices configured to hold instructions executable by logic subsystem 602 to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) as opposed to being stored on a storage medium.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides an optical system, comprising an illumination source configured to emit light, a first scanning stage configured to receive the light and to scan the light, and a second scanning stage configured to receive and direct the light from the first scanning stage toward a projected exit pupil. The one or more of the first scanning stage and the second scanning stage may additionally or alternatively include a Risley prism pair. The one or more of the first scanning stage and the second scanning stage may additionally or alternatively include a scanning electro-optic element. The one or more of the first scanning stage and the second scanning stage may additionally or alternatively include a liquid crystal element. Further, the one or more of the first scanning element and the second scanning element may additionally or alternatively include a plurality of electrowetting lenses. The illumination source may additionally or alternatively include a point source. The illumination source may additionally or alternatively include a two-dimensional array source. The optical system may additionally or alternatively include a waveguide positioned to receive light at the projected exit pupil. The waveguide may additionally or alternatively include a pupil replication stage. The optical system may additionally or alternatively include a partially reflective mirror positioned to receive light from the second scanning element and to redirect at least a portion of the light toward an eyebox. The optical system may additionally or alternatively include a computing device and an eye tracking device, and the computing device may additionally or alternatively be configured to produce higher resolution foveal images and lower resolution peripheral images based upon eye tracking data from the eye tracking device. The eye tracking device may additionally or alternatively include one or more light sources, a camera, and a waveguide may additionally or alternatively be configured to deliver light from the light sources toward an eyebox, and to deliver image data from the eyebox to the camera.

Another example provides a method of operating a display device, the method comprising emitting light via an illumination source, receiving the light at a first scanning stage and scanning the light along at least one dimension, and receiving the light at a second scanning stage and directing the light via the second scanning stage toward a projected exit pupil. In this example, one or more of receiving the light at the first scanning stage and receiving the light at the second scanning stage may additionally or alternatively include receiving the light at a Risley prism pair. Further, one or more of receiving the light at the first scanning stage and receiving the light at the second scanning stage may additionally or alternatively include receiving the light at a scanning electro-optic element. The method may additionally or alternatively include receiving the light at a waveguide and propagating the light through an exit pupil replication stage of the waveguide. The method may additionally or alternatively include receiving eye tracking data from an eye tracking device, and providing higher resolution foveal images and lower resolution peripheral images based upon the eye tracking data.

Another example provides an optical system, comprising an illumination source configured to emit light, a scanning electro-optic element configured to receive the light and to scan the light, and a waveguide configured to receive light from the scanning electro-optic element and to direct the light toward an eyebox, the waveguide comprising a pupil replication stage. Additionally or alternatively, where the scanning electro-optic element is a first scanning stage, the optical system may include a second scanning stage configured to receive the light from the scanning electro-optic element and to direct the light toward a projected exit pupil. The scanning electro-optic element may additionally or alternatively include one or more of an electrowetting element, a liquid crystal element, and a deformable polymer element.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed is:

1. An optical system, comprising:
    a controller modulating one or more output signals comprising image data defining image content;
    a linear array generating light forming a vertical field of view of the image content based on the one or more output signals;
    a first scanning stage for receiving the light from the linear array, wherein the first scanning device redirects portions of the light from the linear array to generate an output light defining a horizontal field of view of the image content based on the one or more output signals of the controller, wherein the first scanning device combines the vertical field of view formed by the linear array and the horizontal field formed by the first scanning device to create a two-dimensional light image of the content;
    a second scanning stage configured to receive the output light from the first scanning stage, wherein the second scanning stage directs the output light comprising the two-dimensional light image of the content toward a projected exit pupil; and
    a partially reflecting mirror positioned to receive the output light from the second scanning stage by the projected exit pupil, wherein the partially reflecting mirror directs at least a portion of the output light for facilitating a view of a real-world background to the image content.

2. The optical system of claim 1, wherein one or more of the first scanning stage and the second scanning stage comprises a Risley prism pair.

3. The optical system of claim 1, wherein the first scanning stage comprises a linear array of electrowetting microprisms to perform a non-mechanical steering of the light at angles controlled by the one or more output signals.

4. The optical system of claim 3, wherein one or more of the first scanning stage and the second scanning stage comprises a liquid crystal element.

5. The optical system of claim 3, wherein one or more of the first scanning stage and the second scanning stage comprises a plurality of electrowetting lenses.

6. The optical system of claim 1, further comprising a waveguide positioned to receive the output light from the second scanning stage at the projected exit pupil, wherein the waveguide comprises a pupil replication stage to replicate and expand the exit pupil using a surface relief grating.

7. The optical system of claim 6, wherein the waveguide comprises:
    an input section for receiving light at the exit pupil;
    a pupil replication stage; and
    a plurality of reflecting surfaces for reflecting the output light from the input section to the pupil replication stage.

* * * * *